United States Patent [19]

Chen et al.

[11] Patent Number: 5,538,265
[45] Date of Patent: Jul. 23, 1996

[54] RETRACTABLE STEP FOR A TRUCK

[75] Inventors: David E. Chen; Melvin A. Hendricks, both of Fort Wayne, Ind.

[73] Assignee: Navistar International Transportation Corp., Chicago, Ill.

[21] Appl. No.: 371,729

[22] Filed: Jan. 12, 1995

[51] Int. Cl.⁶ .................................................... B60R 3/02
[52] U.S. Cl. ........................................ 280/163; 280/166
[58] Field of Search .................... 280/163, 166; 296/183; 105/443, 445, 447, 449; 182/95, 97, 98

[56] References Cited

U.S. PATENT DOCUMENTS

| | | | |
|---|---|---|---|
| 1,542,113 | 4/1924 | Vogel | 280/166 |
| 3,171,671 | 3/1965 | Cornett | 280/163 |
| 3,394,947 | 7/1968 | Strube, Sr. | 280/166 |
| 3,930,755 | 1/1976 | Lahr et al. | |
| 3,955,827 | 5/1976 | Wonigar | 280/166 |
| 4,126,350 | 11/1978 | Briers et al. | 280/163 |
| 4,168,134 | 9/1979 | Pohl | 105/445 |
| 4,185,849 | 1/1980 | Jaeger | |
| 4,200,303 | 4/1980 | Kelly | 280/166 |
| 4,231,583 | 11/1980 | Learn | 280/166 |
| 4,326,750 | 4/1982 | Rosenbaum | |
| 4,356,894 | 11/1982 | Everett | 105/445 |
| 4,570,962 | 2/1986 | Chavira | 105/447 |
| 4,842,325 | 6/1989 | Irelan | 296/146 |
| 4,865,349 | 9/1989 | Church, Jr. | |
| 5,085,450 | 2/1992 | DeHart, Sr. | 280/166 |
| 5,375,864 | 12/1994 | McDaniel | 280/166 |

FOREIGN PATENT DOCUMENTS

| | | | |
|---|---|---|---|
| 2752888 | 5/1979 | Germany | 280/166 |
| 1-115752 | 5/1989 | Japan | 280/166 |
| 8403 | of 1911 | United Kingdom | 280/166 |

*Primary Examiner*—Eric D. Culbreth
*Assistant Examiner*—Min Yu
*Attorney, Agent, or Firm*—Dennis K. Sullivan

[57] ABSTRACT

A door-activated retractable step for a truck includes at least one step cavity disposed within a side wall structure of the truck in proximity to a door thereof. An extendable cover for the step cavity housing, when closed, creates an aerodynamic continuation of the side wall structure containing the step cavity. The cover is pivoted about a horizontal hinge in response to the truck door being opened to form a continuation of the tread surface, creating a wide step.

13 Claims, 5 Drawing Sheets

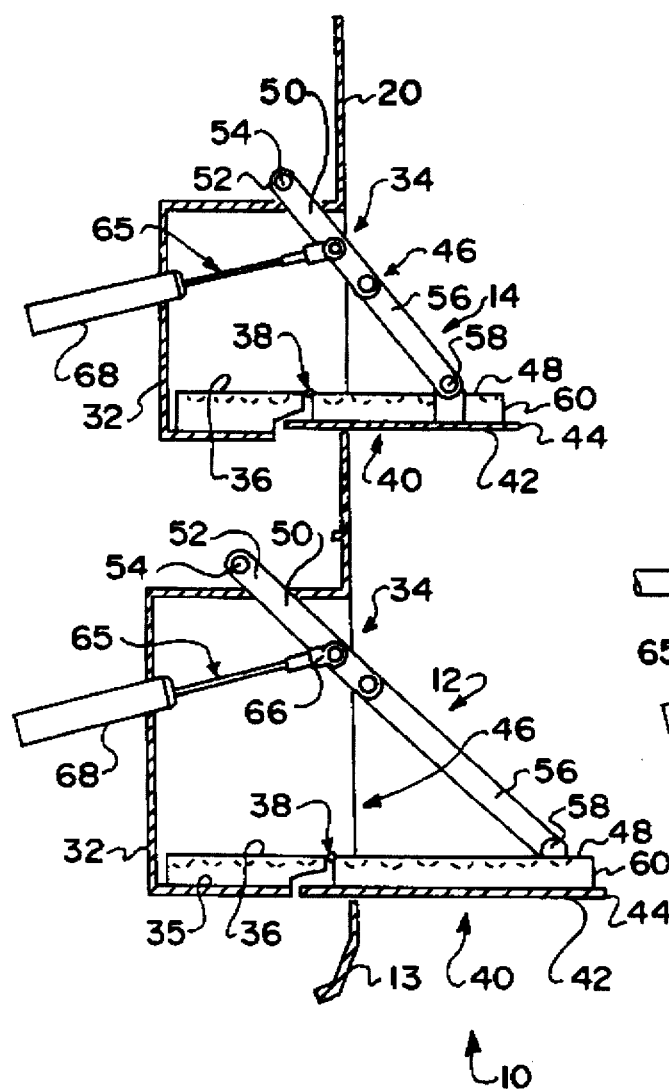
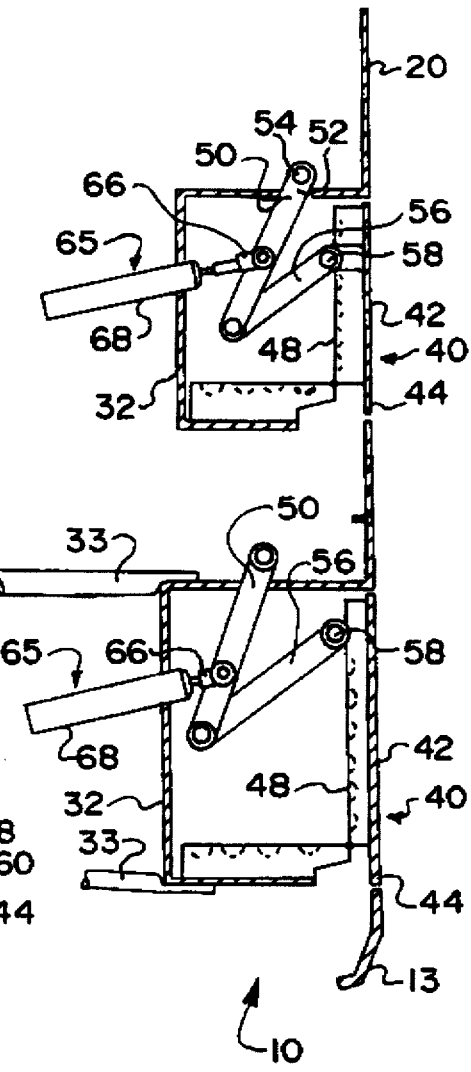

5,538,265

RETRACTABLE STEP FOR A TRUCK

BACKGROUND OF THE INVENTION

The present invention relates to an automatically deployed retractable step for a heavy duty truck. More particularly, the step, when folded up, forms part of the side wall from which it extends and, when folded down, creates an enlarged step surface which continues into a cavity in the side wall.

THE PRIOR ART

It is previously known, for example, from U.S. Pat. No. 4,200,303, to provide an automatically deployed step which is activated by vehicle door operation.

Further, the provision of a step having a body panel attached to an outer surface thereof has been taught in connection with a pop-up camper in U.S. Pat. No. 4,842,325, the body panel forming part of the vehicle wall when the step is stowed thereagainst in its folded up position.

Still further, a self-concealing step cavity having a spring loaded inwardly pivoting tread plate providing a cavity concealing door has been taught in U.S. Pat. No. 3,171,671. However, the tread remains within the body and the effective tread width is thus limited to the part of the foot forward of the leg.

Despite these teachings, heavy duty trucks, particularly those of a cab-over-engine configuration, are known for poor cab accessibility due to the presence of a large front wheel below the cab entrance. In this respect, previous cabover heavy duty trucks offer only narrow steps within the body for a driver as he climbs up into the cab. Further, the area of a truck body within which a step may be formed is restricted in height by the cab structure itself, i.e., the space available between the cab floor and the underlying wheel well, or the height of a bumper side wall.

On the other hand, the aerodynamics of a truck cab can be substantially compromised by attachments, such as steps, extending beyond the body of the cab during operation, especially at highway speeds, resulting in additional parasitic power usage with a corresponding reduction in fuel economy and increased emissions. Even exposed cavities in the body surface may be harmful to the aerodynamics although much less so.

SUMMARY OF THE INVENTION

Accordingly, it is a primary object of the present invention to provide a step system for a heavy duty truck which offers a maximized step width significantly greater than that of a cavity step while taking into account available vertical wall space within which steps are to be formed.

It is a further object of the invention to provide a step which deploys automatically, with the step being made available for driver use in the event of system malfunction.

Still further, it is an object of the invention to provide wide steps which will not compromise vehicle aerodynamics when the vehicle is in operation.

These as well as other objects of the invention as may appear hereinafter are specifically met in a heavy duty cabover truck by a retractable step which is hinged to the truck for folding about a horizontal axis disposed along a lower side of a step cavity in a truck wall surface, the step cavity preferably also having a tread surface. The retractable step folds up so that the outer surface thereof forms a continuation of the vehicle wall surface when retracted and, when deployed, the upper tread surface forms a continuation of the step cavity tread surface. The retractable step is automatically deployed upon opening the cab door and defaults to a deployed position if a system malfunction should occur.

BRIEF DESCRIPTION OF THE DRAWINGS

Other objects and advantages of the invention will become more apparent upon perusal of the detailed description thereof and upon inspection of the drawings in which:

FIG. 5 is a cross section through both steps of the system showing the retractable steps in their deployed position;

FIG. 6 is a cross section similar to FIG. 5 but showing the retractable steps in their retracted position, each forming a continuation for aerodynamic purposes of the vehicle side wall surface.

DESCRIPTION OF THE PREFERRED EMBODIMENT

Figure 1:
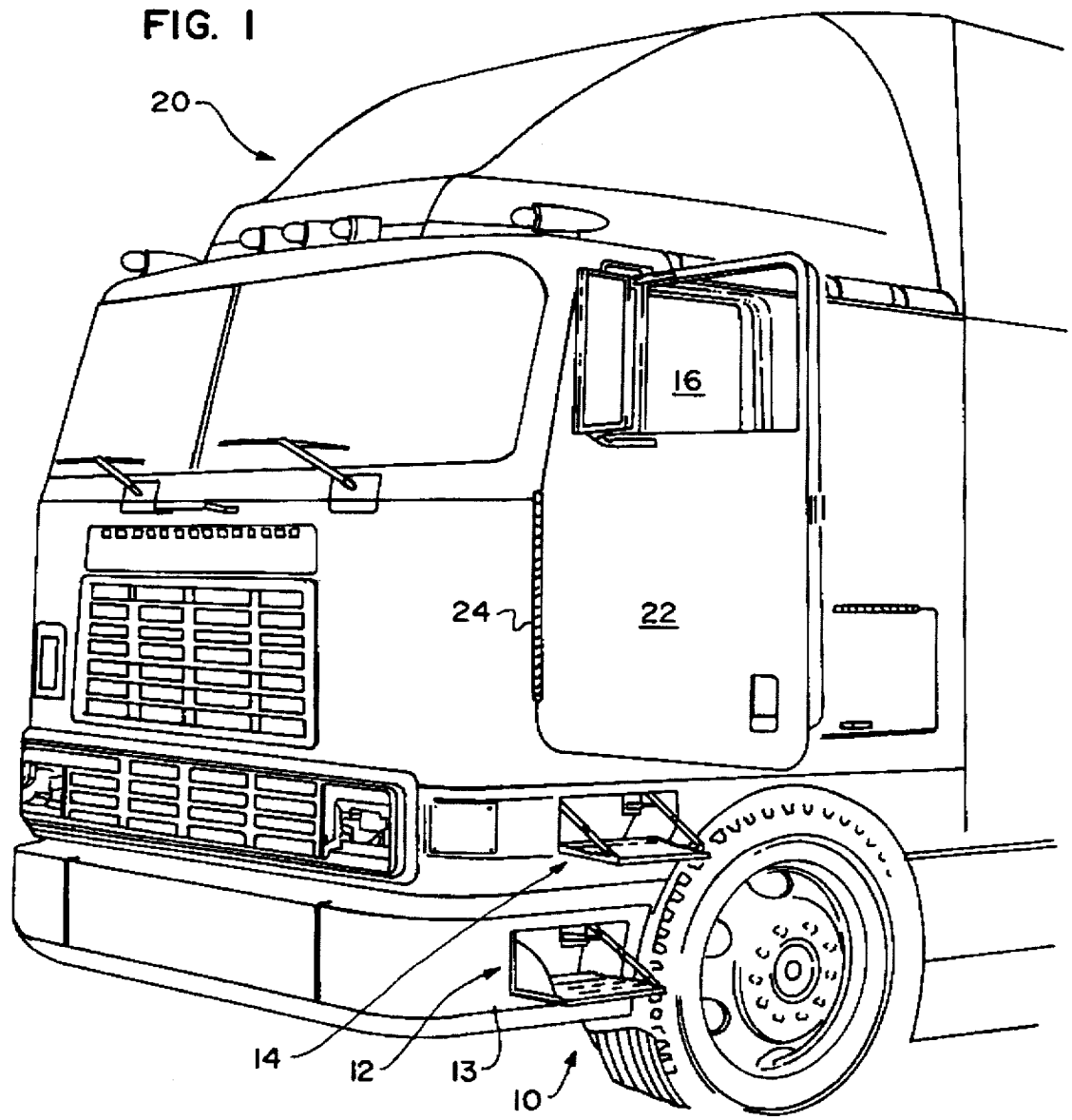
FIG. 1 is a perspective view of a truck cab showing a door of the cab in an open position thereof and showing two retractable steps made in accordance with the teachings of the present invention in their deployed position.

Referring first to FIG. 1, there is illustrated therein a retractable step system 10 for a truck.

The step system 10 includes a lower step 12 mounted in the surface of a front bumper 13 and an upper step 14 mounted mounted in the surface of a cab body 20, these steps 12 and 14 leading, in sequence, toward a driver compartment 16 of the truck cab 20. The cab 20 has a door 22 which covers the entrance to the driver compartment 16, the door swinging forwardly about a hinge 24.

Figures 2, 2A:
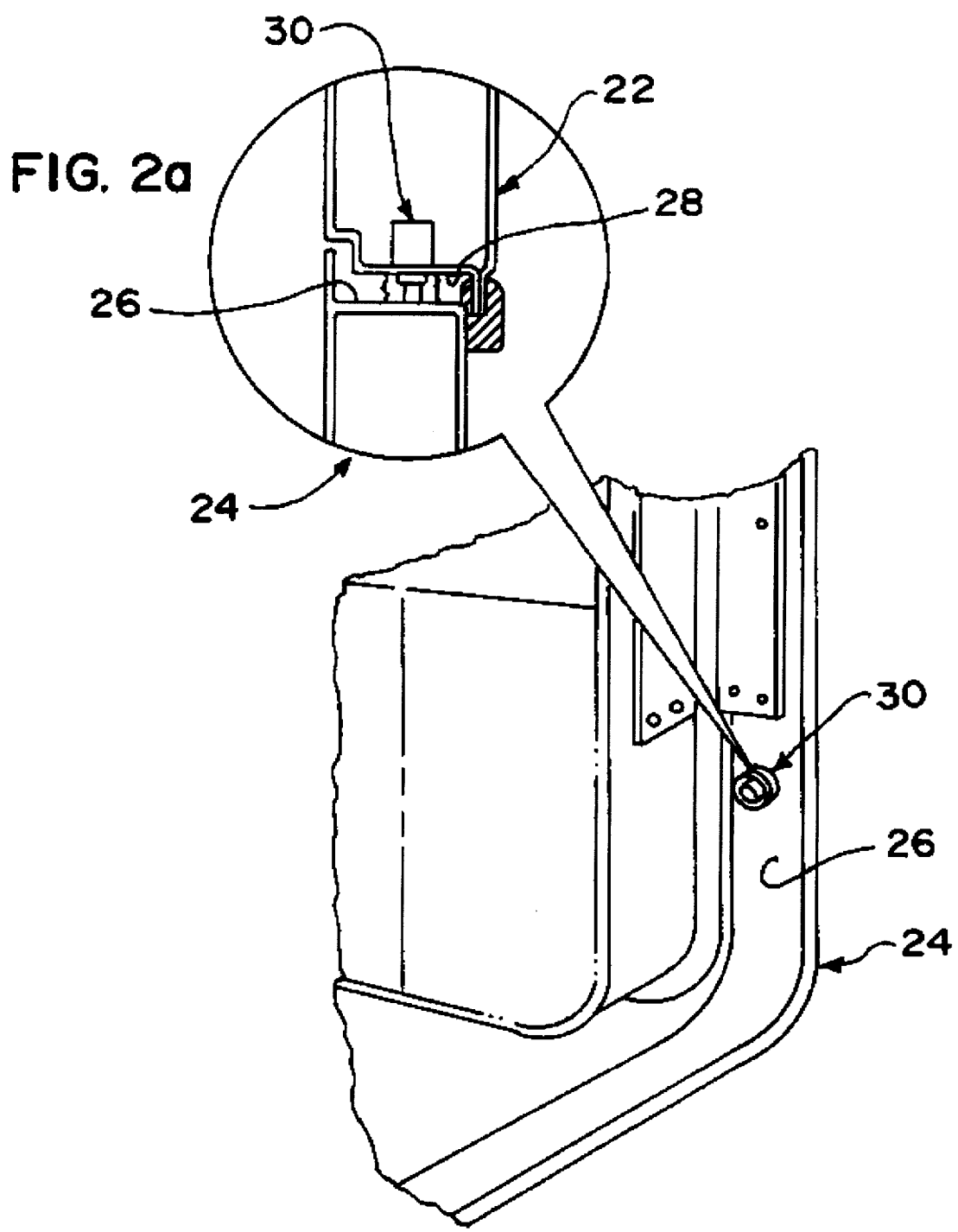
FIG. 2 is an view of a portion of a vehicle door assembly and frame showing an actuator switch for the step mounted thereto.
FIG. 2a is a cross section of the door and frame of FIG. 2 taken through the actuator switch but showing the door in the closed position.
Figure 3:
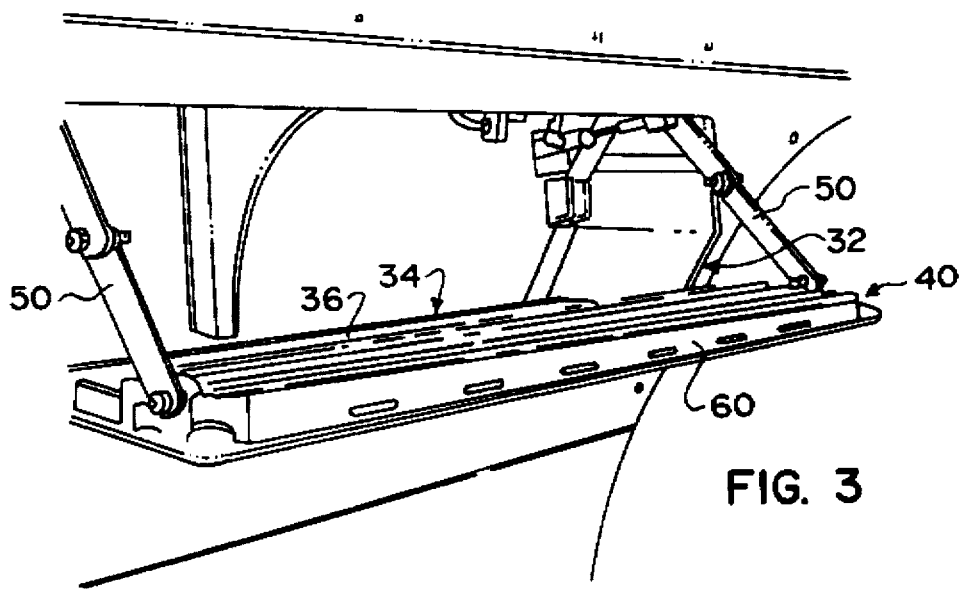
FIG. 3 is an enlarged view of the upper step of the system.

The entrance to the driver compartment 16 is defined by a door frame 24 (FIGS. 2 and 2a) having a wall 26 which is adjacent but slightly spaced from a side edge wall 28 of the door 22 when the door is closed.

A preferred means for automatically deploying the step system 10 is in response to opening the door. However, the automatic deployment means could be responsive to other inputs associated with the operator entering or leaving the operator's compartment 16, such as remote signals, an infrared sensors, or a motion detectors. In the preferred arrangement, an actuator switch 30 may be mounted in a known manner similar to a conventional interior light actuator switch or other actuator to cause system 10 to be activated when the door 22 is opened to lower the steps 12, 14 and to cause to retraction of the steps 12, 14 when the door 22 is closed.

Turning now to a study of the mechanics of the steps 12, 14, it will be seen that each step 12, 14 includes a housing 32 located behind and opening into the surfaces respectively of the bumper 13 and the cab 20. The housings 32 are supported by the vehicle frame (not shown) by bracing partially shown at 33. The housing 32 defines a step cavity 34 for each step 12, 14 and may be provided with a tread plate 36 suitably secured to a bottom surface 35 thereof to assure frictional engagement for a user's footwear.

A cover member 40 for the step cavity 34 is pivotally attached to an outer edge of this tread plate 36 by a piano hinge 38. This cover member 40 serves a twofold purpose in the step system 10. First, when closed, it acts as an aerodynamic continuation of the particular wall surface of the bumper or cab within which the step cavity 34 is located. In this respect, one surface 42 of the cover 40 includes a panel 44 which, when the cover 40 is retracted, seats flushly over the opening 46 into the step cavity 34 as shown in FIG. 6.

Secondly, when a cover member 40 is provided on its inner or upper side with a tread plate 48 thereon similar to tread plate 36 so that when cover member 40 is in its extended position, as shown in FIG. 5, a tread plate surface 48 creates a planar continuation of the tread plate 36, thereby providing a wide step surface to facilitate entrance into or exit from the operator's compartment 16.

To assure that the cover member 40 is capable of supporting a substantial amount of weight when deployed, at least one jack-knife pivoting brace assembly 50 is provided for each step having an upper arm 52 which engages by a pivot 54 the housing 32 and a lower arm 56 pivoted to the upper arm which engages by a pivot 58 to the cover member 40 at a point adjacent a swing edge 60 thereof.

Figure 4:
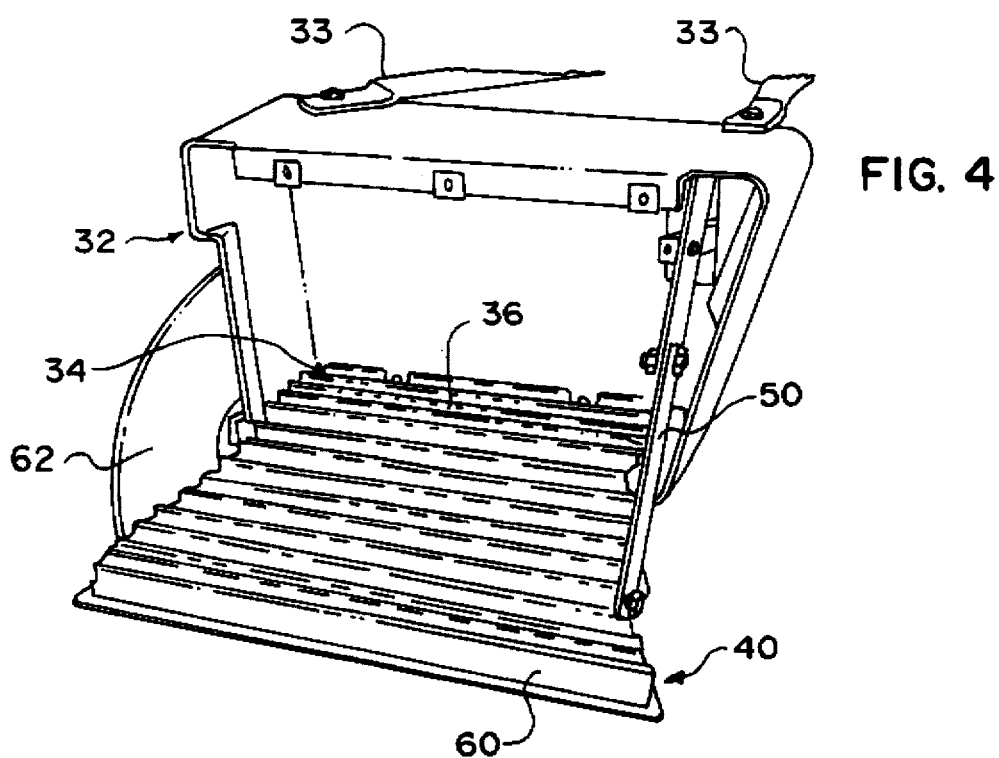
FIG. 4 is an enlarged view of the lower step of the system.

When the cover member 40 is retracted to its closed position, the pivoting brace 50 is stowed within the step cavity housing 32. It will be seen from FIG. 4 that an arcuate sliding brace 62 may be used in place of the jack knife braces 50 if desired.

In the disclosed embodiment, deployment of each step 12, 14 is accomplished by means of a pneumatic cylinder arrangement 65, the cylinder having a housing 68 extending through a rear portion of the housing 32 to a pivotally attachment (not shown) to support structure therebehind and a rod end 66 thereof pivoted to upper arm 52 of the jack knife brace 50 to cause extension and retraction of the brace 50. The pneumatic cylinder arrangement 65 is shown as exemplary. Other mechanical, electrical, or hydraulic actuators could be used as well.

Figure 7:
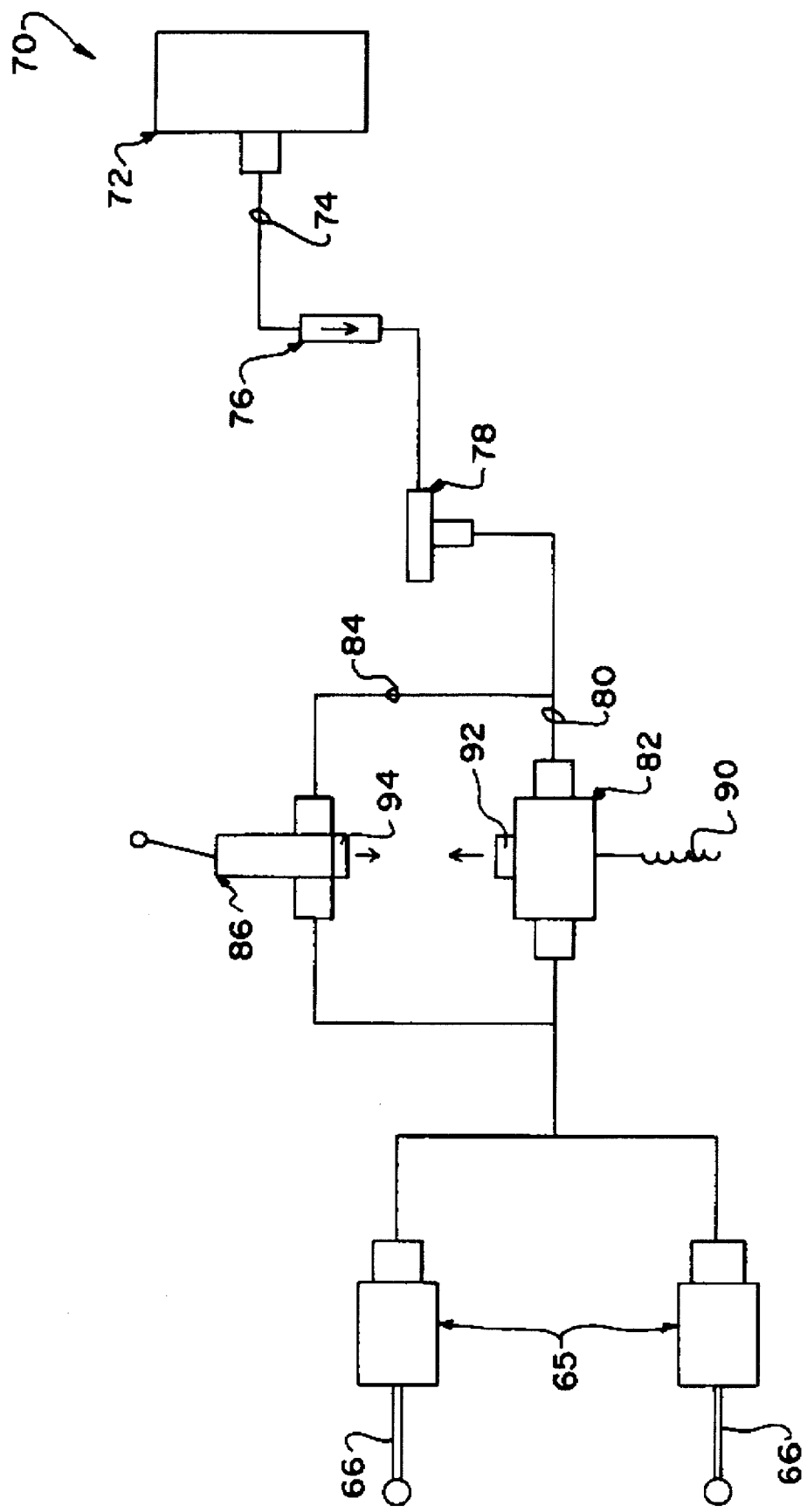
FIG. 7 is a schematic diagram of an operating circuit for controlling the retractable steps.

FIG. 7 is a schematic diagram of a control circuit 70 for use with the exemplary pneumatic cylinder arrangement 65 of the step system 10. In the circuit 70, air for activation of the pneumatic cylinder is provided from the same air reservoir or manifold 72 used for an air brake system (not shown) of the vehicle. An air line 74 extending from the air reservoir 72 is first supplied with a brake pressure protection valve 76 and a pressure reducing valve 78 to provide air under pressure in an operating range for the pneumatic cylinder 65, preferably at about 65 psi.

Downstream of the pressure reducing valve 78, the air line 74 splits and one branch 80 feeds into an inlet to a normally-open solenoid valve 82 while another branch 84 feeds into a conventional manually-actuated flipper valve 86 disposed at a suitable location inside the cab. The branches rejoin downstream of the solenoid valve 82 and extend to the respective pneumatic cylinders 65 which are of the reverse actuating type so that when air is supplied thereto through the normally-open solenoid valve 82, the rods 66 are maintained retracted, with the cover members 40 being maintained closed.

When a signal from the door activated switch 30 is received by the solenoid valve 82 via a line 90, the solenoid valve 82 closes to cut off the supply of air to the pneumatic cylinder 65. The air in the system 10 downstream of the solenoid valve 82 is exhausted through an exhaust port 92 of the solenoid valve 82 and, as pressure to the pneumatic cylinder 65 is depleted, the rods 66 thereof are extended to causing pivoting brace assemblies 50 to deploy the cover members 40. When the solenoid valve 82 returns to its normally-open state upon closure of the cab door 22, the rods 66 are again retracted, causing the cover members 40 to close.

By the provision of the reverse activating pneumatic cylinders 65, it will be seen that, should an air supply malfunction occur, wherein the air pressure drops in the air lines, the cover members 40 will automatically open to their deployed position and be maintained extended until air pressure is restored.

In the event of a failure other than an air pressure drop, the manually operated flipper valve 86 is provided so that the driver may manually lower the cover members 40. The flipper valve 86 is engaged to a spring (not shown) within each pneumatic cylinder 65 which is capable of overcoming the air pressure in the lines to lower the cover members 40 even when air pressure is maintained in the control system 70.

As described above, the retractable step of the present invention has a number of advantages, some of which have been described above and others of which are inherent in the invention. It will be evident that modifications may be made to the invention, particularly in the actuating means, without departing from the teachings herein. Accordingly, the scope of the invention is only to be limited as necessitated by the accompanying claims.

What is claimed is:

1. In combination with a truck having an operator's compartment and a side wall, a retractable step for entering said operator's compartment comprising:

a step cavity defined by a housing disposed within said side wall in an area in close proximity to said operator's compartment, said housing having a bottom wall including a step surface;

a cover movably secured to said truck and operatively associated with said step cavity and having a first closed position wherein said cover creates an extension of said side wall and a second deployed position wherein said cover creates an extension of the bottom wall of said step surface of said step cavity, and forming, with said step surface of said step cavity, a step surface that is larger than the surface of said cover, said cover having the same height a said bottom wall of said step surface; and automatic control means responsive to a means for detecting an operator entering or leaving said compartment to place said cover in said deployed position.

2. The invention in accordance with claim 1, said operator's compartment having a door and said automatic control means being responsive to the position of said door to move said cover to the deployed position upon said door being open, and, upon said door being closed, to move said cover to the closed position.

3. The invention according to claim 1 wherein said cover is pivotally mounted adjacent a lower surface of the housing by a horizontal hinge and pivots thereabout between said closed and deployed positions in a direction outwardly from said housing.

4. The invention according to claim 3 and a means for limiting the pivotal travel of said cover beyond said deployed position.

5. The invention according to claim 4 wherein said limiting means is a pivoting linkage extending between said housing structure and said cover.

6. The invention according to claim 5 wherein a linear actuator controlled by said automatic control means through a control circuit pivotally engages said linkage to move said cover between said positions.

7. The invention according to claim 6 wherein a door position sensor is operatively connected to said control circuit for said linear actuator.

8. The invention according to claim 6 wherein said linear actuator is a pneumatic cylinder.

9. The invention according to claim 8 wherein said door position sensor is an electrical sensor provided for sensing an open position and a closed position of the cab door.

10. The invention according to claim 9 wherein said control circuit includes in series a source of pressurized air, and a solenoid valve connected to said pneumatic cylinder, said solenoid valve being electrically connected and responsive to said door position sensor.

11. The invention according to claim 10 wherein pneumatic cylinder is a reverse single activating cylinder wherein said piston is retracted when air pressure is supplied thereto, said solenoid valve is normally-open.

12. The invention according to claim 11 further including a manually operable valve functionally engaged within said control circuit which, upon manual operation thereof, causes deployment of said cover.

13. An extendable/retractable step for a truck cab including:

at least one step cavity housing structure disposed within a side wall of the cab at a position near a door of the cab, said cavity having a lower surface including a step surface;

a cover for said step cavity housing structure pivotally engaged on a horizontal axis to a lower edge of said housing, said cover having a step surface disposed thereon and forming, with said step surface of said step cavity, a step surface that is larger than the surface of said cover, said cover step surface having the same height as said step surface of said step cavity;

means for pivoting said cover about said hinge between a vertical closed position and a horizontal deployed position thereof; and control means, including a door position sensor, operatively associated with said means for pivoting said cover and responsive to said sensor, to move said cover to the vertical position when the cab door is closed is sensed and to the horizontal position when cab door is not closed.

* * * * *